July 14, 1936.     B. W. FREEMAN ET AL     2,047,198

ORNAMENTING MACHINE

Filed May 31, 1935     6 Sheets-Sheet 1

Fig. 1.

Inventor
Benjamin W. Freeman
John Schneider.
By Riordan & Riordan
Attorney

July 14, 1936.  B. W. FREEMAN ET AL  2,047,198
ORNAMENTING MACHINE
Filed May 31, 1935  6 Sheets-Sheet 6

Inventor
Benjamin W. Freeman,
John Schneider.
By Riordan & Riordan
Attorney

UNITED STATES PATENT OFFICE 2,047,198

ORNAMENTING MACHINE

Benjamin W. Freeman, Cincinnati, Ohio, and John Schneider, Latonia, Ky., assignors to The Louis G. Freeman Company, Cincinnati, Ohio, a corporation of Ohio Application May 31, 1935, Serial No. 24,439

39 Claims. (Cl. 101—316)

The present invention relates to machines for use in the manufacture of boots and shoes, and more particularly to combined marking and cutting machines adapted for operations upon skins, upper blanks, fitted or closed uppers, and the like, in which the work is marked with ink, pigment, or its equivalent, at the same time or as part of a cycle of operations during which the work is also ornamented by perforating or cutting out the design therein.

More particularly this invention relates to improvements upon devices and machines for accomplishing such work, as mentioned, described, and claimed in our co-pending application, Serial No. 753,766, filed November 19th, 1934, and to which reference is hereby made.

These machines are of the type intended for use as "universal" cutout and marking machines, particularly intended for work on shoes, leather, and shoe materials, where the work is of widely varying contour and design, the machines being adapted to operate not only upon flat material, but also to perform operations on other than flat work, such as closed and fitted uppers and other types of ring-like work.

Among the objects of the invention are the formation of ornamental designs in the work by the application of a stamped or printed marking, which may simulate stitching, or may take the form of a design, by the production of ornamental cut outs in the work, by combinations of both marked and perforated designs, and in performing the marking and cutting operations, either simultaneously or during a continuous cycle of operations.

Reference to stamped or printed markings is made herein because of its universal adaptation to all types of leather; however, the present invention is likewise readily adaptable to the production of other forms of marking, e. g., impression or indentation of the work. It is an object herein to provide means for applying one form of marking or another, by a slight adjustment.

Markings may be used as a guide for subsequent operations on the shoe parts, such as aligning the parts relative to each other, stitching, etc.

It is contemplated that the marking device may be combined with or form a part of the conventional stripper plate which is normally designed for stripping the work from the cutting edges of the die.

Various safety mechanisms assuring a predetermined cycle of operations, and designed to prevent injury to an operator or to the work by preventing premature or inaccurate operations, form a feature of this invention.

As described in our aforesaid copending application, and illustrated herein, a preferred embodiment of the machine has a power driven plunger movable through a relatively vertical plane, the plunger serving to mount a work support on which the work may be accurately positioned, by means of suitable gaging devices. A backing medium of paper or its equivalent may be provided between the work and the support.

Still another object of the present invention is to provide a single control, as a treadle, for operating mechanism by means of which the die may be moved into an operating position, inked during its passage to such position, the main operating clutch of the machine released, the work support and operating plunger raised to effect an ornamenting operation, and the die thereafter moved to a position away from an operator who is then free to remove the work from the machine.

Our copending application aforesaid, illustrates the broad principle of a mechanism for accomplishing these several results, under a single control, and the disclosures herein aim toward simplification of the driving or operating mechanism, and the arrangement of such mechanism in a compact unit, this being one of the improvements over the machine of the copending application, the general aims and objects as set forth in said application, being, however, retained.

Another improvement contemplates automatic control of movements of the operating plunger and other portions of the machine, by the die carriage whereby to obtain a more perfect synchronism, and accurate relation of parts.

Ornamenting machines for forming cutouts in a work piece, or for marking same, and for effecting both operations, are of course known, but these prior art machines either cannot handle extremely heavy work, or work involving the pressures required to produce a very great number of perforations, or experience difficulty in stripping the work after an operation. As the number of cutouts or perforations increases, the pressure requirements for ornamenting and for stripping also increase and a primary purpose of this invention is to overcome such difficulties without, however, increasing the size of the machine to an impractical degree.

Among the main or principal features of this machine are a substantial difference in the arrangement of parts over prior art machines which endeavor to obtain similar results, i. e., the work supporting plunger partakes of a movement toward and from the die through a generally vertical plane, the die unit remaining fixed insofar as the plane of travel of the work support is concerned, while being movable through a substantially horizontal plane into and out of operating position.

Such arrangement permits maintenance of necessary clearance between the die and work support, facilitates changing of dies in the machine, fitting of the work into proper position, and inking of the marking elements. It also permits a decrease in the operating stroke of the plunger, as compared with prior art machines, and avoids excessive inertia in moving parts. Furthermore, where it was essential from the standpoint of safety in many prior art machines, that the operator wait until all moving parts had come to rest, with the present apparatus the operator may be handling the work in perfect safety even though the die is still moving to its inoperative position after cutting or marking the work.

One of the most important features of the present invention relates to the mechanism and method of stripping the work from the die. Conventional strippers include some mechanism directly associated with the die unit, e. g., a stripper plate mounted on springs which serve to normally maintain the plate in a position slightly in advance of the cutting edge of the die. The spring pressure must be so adjusted as to accommodate varying thicknesses of leather or other material upon which the die is working and difficulties arise in this connection, particularly when marking edges are placed on the stripper. Thus if the spring pressure is adjusted to mark and strip properly a light piece of calfskin, it would probably injure a heavy piece of leather. Obviously, when the material is thick, the stripper will be depressed by the material, more than would be the case with thin leather. Varying pressures are required with different characters of leather as well as with different thicknesses, and as the number of cutouts or perforations in a piece of work is increased, the need for greater pressure likewise increases, and such pressures are very difficult of attainment with the conventional stripping devices now in use.

These difficulties and objections have been largely overcome by my patented methods and devices for ink marking and cutting, mentioned in our aforesaid application, but even they are limited as to the treatment of extremely heavy work, requiring heretofore unheard of pressures in such machines. In other words, some desired types of work require pressures too great for satisfactory stripping.

In the solution of these problems, particularly that of extreme pressures, the present invention contemplates a stripping mechanism wherein the pressure is applied by an arrangement independent of any particular die, this being accomplished by building a stripper pressure applying mechanism into the machine, as distinguished from supplying an individual die with a self-contained, complete stripping arrangement. The usual stripper plate, mounted in advance of the cutters, is retained, and this plate may be formed with marking edges thereon.

In commenting upon the universal features of this machine, it should be noted that the structure is readily adaptable to various types of dies and to various operations. For example, a self-contained auxiliary type of die and paper feed mechanism may be utilized by placement of such auxiliary mechanism upon the work support, which will then act to move the auxiliary die, with the work support, toward the slidable die carriage in the head of the machine, which carriage will function as a resistance or reaction member.

To the attainment of the foregoing and other objects which will appear as the description proceeds, reference may be made to the accompanying drawings in which:—

Fig. 3 is a rear elevation thereof.

Referring more specifically to the drawings, in which like reference numerals designate like parts, there is disclosed a main frame or housing 15 which may be carried by a suitable base; a work supporting plunger 16 is mounted in the housing for vertical reciprocation in the manner described in copending application, Serial No. 753,766. A die holder or carriage 17 is mounted upon a track or guideway 18—18 in the upper portion of the frame for horizontal reciprocating movement from an inoperative position at the rear of the machine to an operating position over the work support, rollers 19—19 being provided for the purpose.

Power may be supplied to the machine through a main shaft 20 which will mount for free rotation, a suitable fly-wheel pulley (not shown). The shaft 20 will be connected to actuate the plunger 16, when clutched to the fly-wheel, as hereinafter described. The die carriage may be conveniently driven by a compact driving unit mounted at the upper rear of the machine, on a shelf or bracket 25. A pulley 26 is provided in this unit for connection by suitable belt gearing to the constantly driven fly-wheel pulley mounted thereon.

Die holding carriage drive and control

Figure 1:
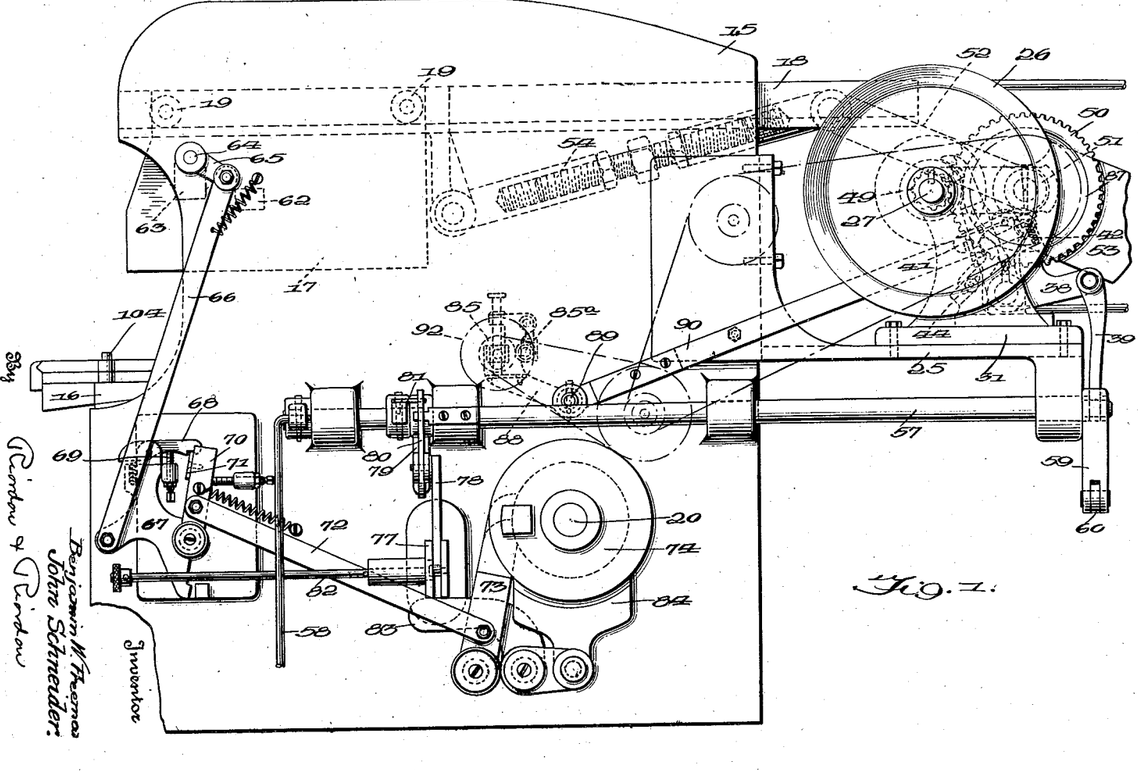
Fig. 1 is a side elevation of a preferred form of machine.
Figure 2:
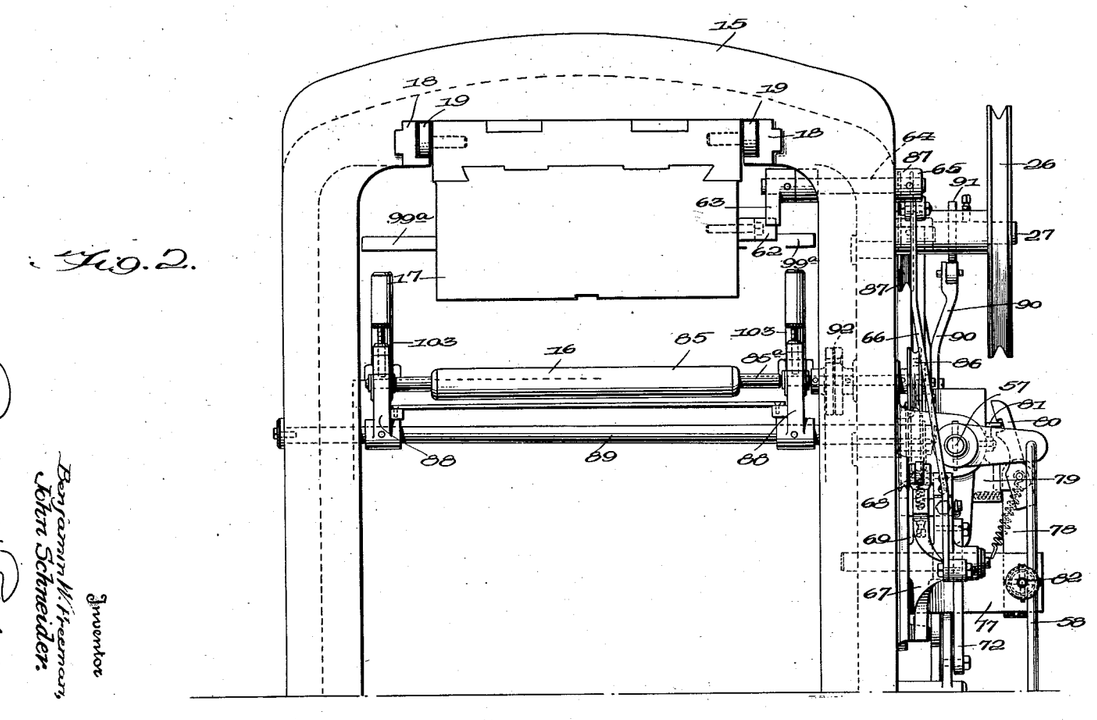
Fig. 2 is a front elevation thereof.
Figure 4:
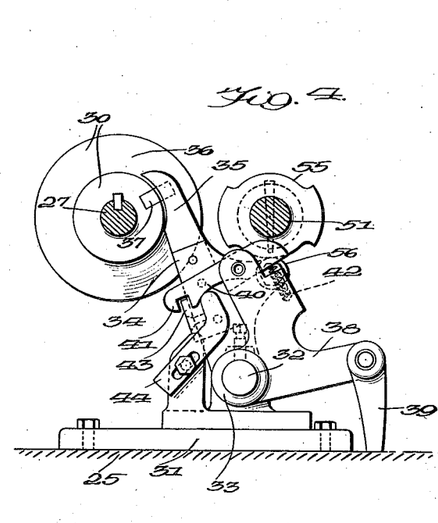
Fig. 4 is an enlarged detail in elevation of a clutch control device.
Figure 5:
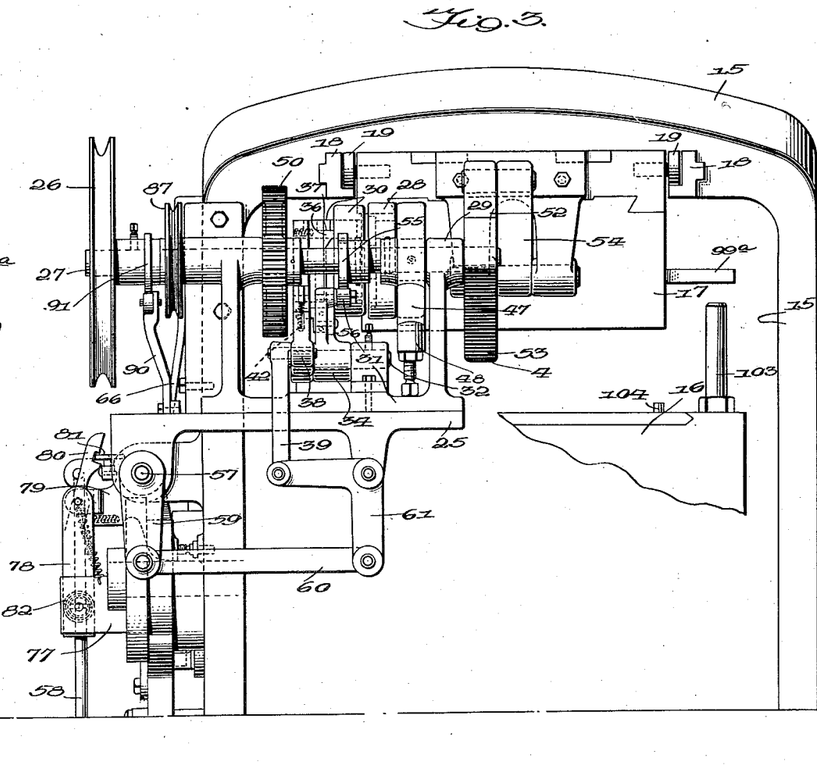
Fig. 5 is an end elevation of the structure shown in Fig. 4.

The carriage driving mechanism is best illustrated in Figs. 1 and 3. The pulley 26 is keyed to a shaft 27 which is thereby continuously driven from the main source of power applied to the pulley by the constantly driven fly-wheel. This shaft has keyed to it a clutch member 28, the hub of which extends along the shaft into a shaft bearing 29. A clutch unit 30, cooperative with the keyed member 28 is mounted for free movement on the shaft, the complete clutch being controlled by a clutch control unit carried by a base 31, which is secured to the bracket 25. This unit is best shown in Figs. 4 and 5, and comprises a stub shaft 32 secured in the bearing 33 and upon which shaft is pivoted a lever 34. The lever 34 terminates in a tapered finger 35 which projects into an annular channel 36 of the clutch control unit 30, which unit, as has been stated, is free upon the shaft 27. Slidable transversely of the slot is a clutch key 37, which is spring urged across the channel 36 and through the unit 30 to a position where it will project into a suitable recess in the clutch member 28 which is keyed to the shaft 27. Thus it will be seen that the key 37 affords a means of clutching the unit 30 to the member 28 for rotation therewith as the shaft 27 rotates. Normally, however, the finger 35, resting in the channel 36, will block the key 37 and hold it against its spring pressure, thus keeping the unit 30 and member 28 in a declutched relation.

Also mounted on the stub shaft 32 is a crank 38, one end of which is secured to an actuating link 39, and the other end of which carries a pivoted dog 40 which terminates at one end in a hook 41. The other end of the dog engages a spring 42 which normally urges the hook 41 downwardly. A flange 43 is secured to the arm 34, projecting into the path of movement of the hook 41. An adjustable cam finger 44 is secured to the base 31, this finger having a rounded end engageable with the under surface of the dog 40, said under surface being curved or cam shaped. The operation of this control device is as follows: A pull on the link 39 actuates the crank 38, whereby the hook 41, engages the flange 43, pulls the lever 34 and the finger 35 out of the path of the key 37, which under influence of its spring, immediately clutches the member 28. As the dog 40 rides over the finger 44, the camming action thereof raises the hook to release the flange 43, whereupon the finger 35 drops back into the channel 36, and as the unit 30 completes its revolution, the tapered end of the finger 36 engages the clutch key 37 and forces it back to declutch the unit 30 from the member 28. Thus the unit 30 will make but a single revolution, although the member 28 will be continuously rotating under influence of the continuously rotating pulley 26.

Formed as a part of the clutch unit 30 is a small gear 49 (Fig. 1) which meshes with a larger gear 50, keyed to a shaft 51, this shaft paralleling the shaft 27. In the illustrated embodiment, the gear ratio between the gears 49 and 50 is four to one, whereupon the shaft 27 must rotate four times to produce a single complete revolution of the shaft 51.

Secured to the end of the shaft 51 is a crank arm 52 which may be suitably counterweighted as indicated at 53, this crank arm being connected to an adjustable connecting rod 54, which in turn is directly connected to the carriage 17. Thus it will be seen that as the clutch unit 30 is coupled to the clutch member 28, the carriage will be actuated. But as it is necessary for the shaft 27 to rotate four times to produce a complete rotary movement of the shaft 51, and hence a complete movement of the carriage 17, means must be provided for preventing a declutching of the unit 30 after the single revolution of the shaft 27. To this end a cam 55 is secured to the shaft 51 and provided with two oppositely disposed high surfaces. The lever 34 carries a cam roll 56, cooperating with the cam 55, the action being that one high surface of the cam engages the roll prior to completion of the first revolution of the shaft 27, and the finger 35 is thus held out of the path of the key 37, permitting the shaft 27 to make a second revolution. By this time the carriage will have reached its outermost or forward position, and the cam 55 will have released the roll, and the carriage is free to stop as the unit 30 is declutched. Means hereinafter described are provided for automatically tripping the link 39 at a predetermined point in the cycle so that the carriage may be returned.

Mounted in suitable bearings at the side of the housing 15 is a rock shaft 57, to which is secured a treadle link 58. The shaft 57 carries a crank arm 59 which is connected by a link 60 to a bell crank 61, which in turn is pivoted to the actuator link 39. Depression of the link 58 by its treadle (not shown), will rock the shaft 57 causing a corresponding movement of the linkage to the link 39, thus operating the clutch control mechanism, and initiating operation of the machine.

The remainder of the sequence of machine operations is entirely automatic.

The shaft 51 carries an eccentric 47 which cooperates with a normally fixed but adjustable brake shoe 48 and as the carriage reaches the end of a stroke, the high point of the eccentric will engage the brake shoe and the parts thus will be quickly brought to rest.

*Plunger actuating and control mechanism*

In making perforations in shoe parts, it is important that the die be forced through the work with a hammer-like blow, and of course it is also essential that the die be accurately aligned with the work at the time this hammer-like blow is struck. Accordingly, movement of the plunger which carries the work into engagement with the die, to strike the blow, is controlled, in the preferred embodiment herein described, by the die carriage itself, as distinguished from a separate control mechanism, thus ensuring more perfect synchronism of operations.

To this end a lug or dog 62 is secured to the side of the die carriage in such a position as to engage a crank arm 63 projecting into the path of the dog, as the carriage reaches its outermost position. The crank arm 63 is carried by one end of a shaft 64 extending through the side of the housing 15. The other end of the shaft 64 is connected by a crank arm 65 and a link 66 to a clutch control mechanism (Fig. 1) similar to that shown in Figs. 4 and 5, and comprising a bell crank 67 pivoted to the side of the housing 15 and carrying a dog 68 having a hook at one end and a spring at the other end as in the case of the dog 40. An adjustable cam finger 69 is mounted on a frame in a position to engage the curved under surface of the dog 68. Also pivoted to the side of the frame is an arm 70 carrying a plate or flange 71 in position for engagement by a dog 68. The arm 70 is connected to a link 72 which in turn is pivoted to a clutch control lever 73, cooperating with a clutch unit keyed to the shaft 20 and designated generally at 74, the structure of the clutch being substantially identical with the unit 30. The clutch key of the unit 74 will, upon release by the lever 73, slide into engagement with the constantly driven fly-wheel, thus clutching the shaft 20 thereto, and upon rotation of the shaft 20, the plunger 16 will be given a quick movement upwardly against the die, and return. Details of the driving mechanism for the plunger may be found by reference to copending application Serial No. 753,766, this particular structure herein being identical therewith.

It was stated above that the cam 55 has operated the clutch control unit 30 to leave the carriage 17 in its forward or outermost position, and that operation of the plunger was initiated by the carriage, on its forward stroke. It is necessary to keep the carriage in its forward position only long enough to accommodate the movement of the plunger, and hence return of the die carriage may be controlled directly by the plunger on its downward movement through the medium of a tripping mechanism illustrated in Fig. 6, this tripping mechanism being similar in structure to the two clutch control arrangements previously described.

Figure 6:
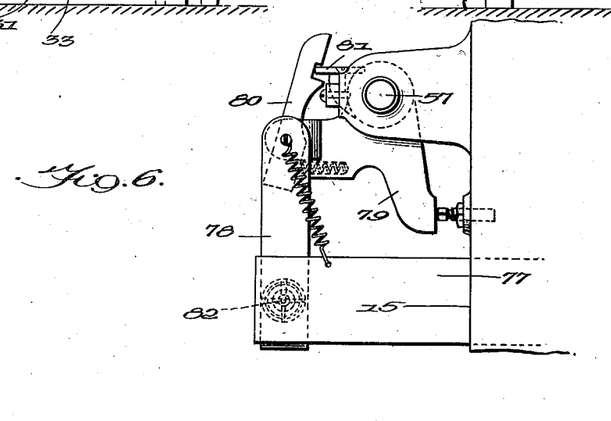
Fig. 6 is an enlarged side elevation of another control device.

An arm 77 extending from the plunger is detachably connected to a link 78, which is pivoted to a bell crank 79. The bell crank 79 carries a spring pressed dog 80 having a hook shaped end which engages a plate 81 rigidly secured to the shaft 57. This hook slips into engagement with the flange 81 on the upper movement of the plunger and on the downward movement of the plunger pulls the flange to rock the shaft 57, thereby tripping the clutch control lever 34, just as though the treadle link 58 had been depressed. As the shaft rocks, the dog 80 slips off the flange 81 and the shaft 57 is then free to return to its original position under influence of the customary treadle spring. In the meantime, however, the shaft 27 will have made two more revolutions, causing a half revolution of the shaft 51 and returning the carriage to its original position.

Should it be desired to leave the carriage at the forward end of its stroke, without return, the pin 82, which latches the link 78 to the arm 77, may be withdrawn whereupon the crank 79 will not operate to trip or rock the shaft 57.

As the arm 77 moves downward with the plunger, it engages a projecting lever 83, which is pivotally connected to a brake shoe 84, designed to engage the exterior of the clutch element 74 and quickly bring the plunger and associated parts to rest.

Inking mechanism

Figure 12:
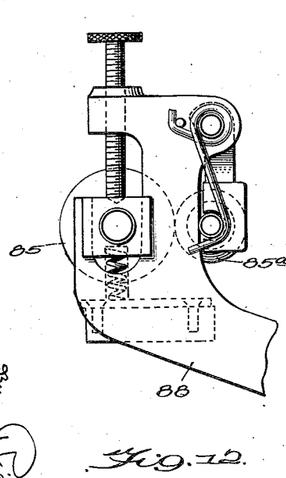
Fig. 12 is an end elevation of the ink applying mechanism, somewhat enlarged.

In order to ink the marking die, there is provided an inking mechanism including an ink-roll 85, this mechanism also including an ink distributing roll resiliently cooperable therewith. The shaft on which the ink roll 85 is mounted is driven by a pulley 86 which is connected through suitable belt gearing to a driving pulley 87 on the shaft 51. Inasmuch as it is advantageous to ink the marking die only as the carriage moves to its forward or operating position, the ink roll is located below the path of the die so that it normally will not contact the marking die. Means are provided for raising the ink roll so that it will contact the marking element on the forward stroke, and releasing it so that it will not contact the marking element on the return stroke. To this end the ink roll is resiliently and adjustably mounted in brackets 88 which are pinned to a rock shaft 89. A link 90 pivoted intermediate its ends to the housing 15, is pinned at one end to the rock shaft 89, and carries at its other end, a cam roll engageable with the cam 91 on the shaft 51. The cam 91 is suitably contoured so as to depress the end of the link 90, thus raising the ink roll at the other end, for the desired length of time and at the desired part of the cycle.

Interposed between the shaft of the roll 85 and the shaft on which the pulley 86 is mounted, is a pair of driving discs generally indicated at 92, and one of which carries a pin adapted to ride in a slot of the other disc. This arrangement permits movement of the ink roll mechanism into and out of operative position, without disturbing the driving arrangement through the pulley 86.

Stripping mechanism

Figure 7:
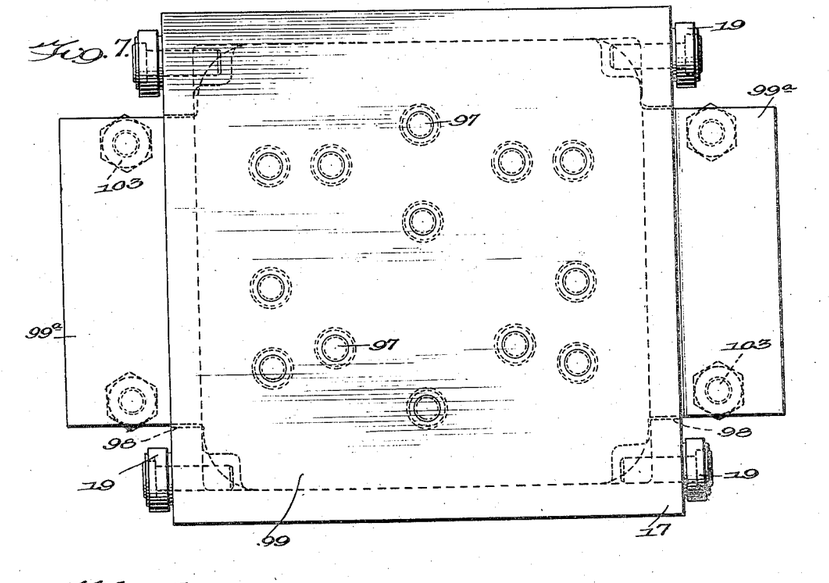
Fig. 7 is a top plan of the die carriage, illustrating the stripper pressure applying member.
Figure 8:
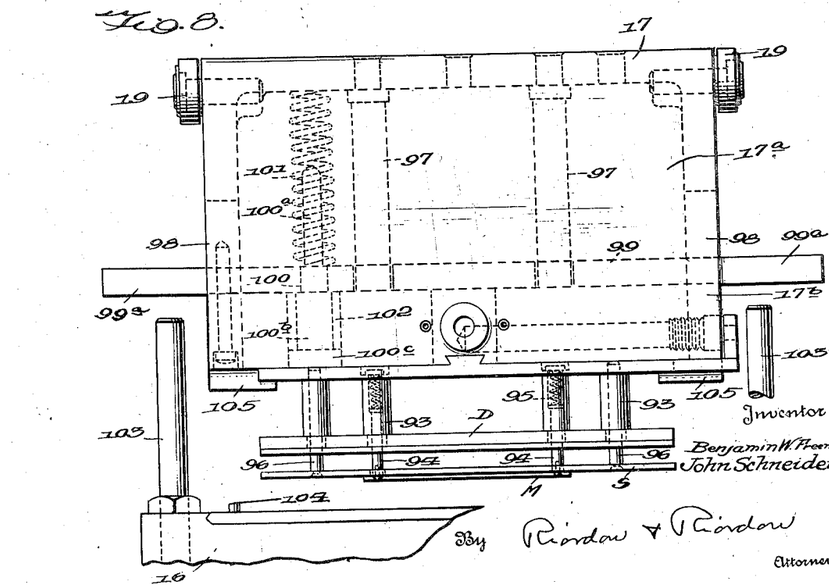
Fig. 8 is a front elevation of the carriage, illustrating the stripper pressure applying mechanism and a die with its stripper plate mounted on the carriage.
Figure 9:
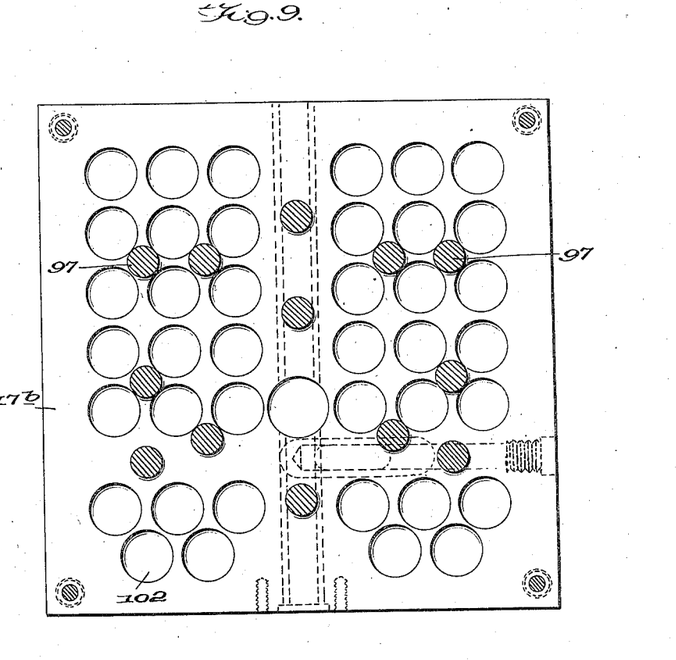
Fig. 9 is a top plan of the die block forming the base of the carriage.
Figure 10:
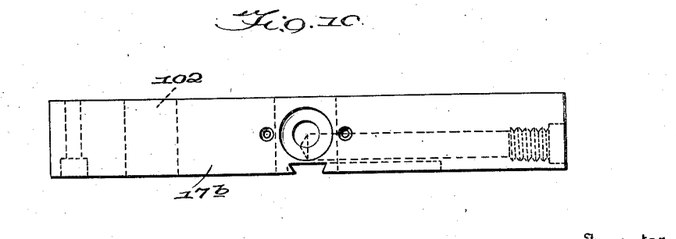
Fig. 10 is an elevation thereof.
Figure 11:
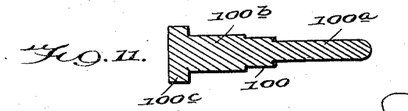
Fig. 11 is a detail in section of a stripper pin.

Referring now particularly to Figs. 7 to 11 inclusive, the details of the improved stripping and pressure applying mechanism may be seen. As shown in Fig. 8, the die carriage 17 is built in the form of a hollow block or housing, having an upper box-like section 17—a, to the top or closed face of which are secured the rollers 19. Extending across the lower open side of the casing 17—a is a thick plate 17—b, which acts to close and complete the housing. The die unit D is detachably secured to the lower outer face of the block 17—b in a known manner, as described in detail in my Patent No. 1,990,597, dated February 12, 1935, and carries the usual stripper plate S, upon which may be mounted ink marking elements M. Conventional struts or sleeves 93 which space the cutter portion of the die from the die block, or base, which is attached to the block 17—b, are provided, and the plate S carries a series of upstanding pins which slide freely within the sleeves. Certain of these pins, indicated at 94, abut springs 95 within the respective sleeves. The springs 95 preferably are very light and only of sufficient strength to maintain the plate S slightly advanced from the cutters in the die D, it being understood that the plate S will be shaped as usual to permit passage of the cutting elements through or past the plate, to the work. The rest of the pins, indicated at 96, are free to slide, not only through their respective sleeves, but also through the die block, and are of such a length as to project slightly into the block 17—b, when the ornamenting operation is taking place on the work.

Within the casing 17—a, and secured to the inner face of the top wall thereof, are a series of struts 97, the length of which is equal to the distance between the inner surface of such wall and the inner surface of the plate 17—b. The purpose of these struts is to reinforce and back up the plate 17—b, which will be subjected to extremely high pressures in normal operation. Any desired number of struts 97 may be utilized as will be found necessary.

The side walls of the casing 17—a will be cut out over a substantial distance front to rear, as indicated at 98. Within the carriage 17 is a plate 99, which is freely movable insofar as the housing 17—a itself is concerned, and this plate is formed with extensions 99—a, which project through the cut-outs or openings 98, extending beyond the side walls of the die carriage or housing 17—a. A series of studs 100 extend through the plate 99 and are rigidly secured thereto. The ends 100—a of the studs which project above the plate are relatively small in diameter and act as guides for springs 101 which extend between the plate 99 and the top wall of the housing 17—a. The block or plate 17—b is formed with a series of holes 102 and the studs 100 have their lower ends 100—b projecting into these openings. At their extreme lower ends, the studs are enlarged to form heads 100—c which are of substantially the same diameter as the openings 102, except for necessary clearance.

When the die D is secured in operating position on the plate or block 17—b, the position of the pins 96 will be such that they can freely enter the respective openings 102.

The plunger or work support 16 is provided with heavy, rigid upstanding posts 103 at each side, these posts being positioned to engage, in balanced relation, the extensions 99—a of the plate 99, when the plunger is in its upward position. The height of the posts may be adjusted in the plunger so as to engage the plate 99 before the marking element M contacts the work. Little or no pressure is required for ink marking, and consequently when the marking element touches the work, it will operate, and this operation will be followed by the cutting out step, by means of the die D, as further relative movement takes place between the work support and the die carriage. In the meantime, as the posts have moved toward the die carriage, the posts will act to push the plate 99 and studs 100 carried thereby away from the block 17—b, at the same time depressing the springs 101. These springs are quite heavy, the number and strength thereof being proportioned to accord with the desired requirements.

As the studs 100 move with the plate 99, clearance will be afforded beneath the heads 100—c of the studs, for the upper ends of the pins 96 on the stripper plate. However, as the die carriage and the work support begin to separate after an ornamenting operation on the work, the posts 103 will release the plate 99 and the springs 101 will exert a very heavy pressure against the pressure plate 99, pushing it downwardly, whereby the stripping plate S will be pushed away from the cutters of the die D by engagement of the pins 96 with the studs 100.

The openings 102 are of greater cross-sectional area than the pins 96, and are so distributed throughout the plate 17b, as to permit a wide leeway to the die maker in locating the pins 96.

It will be found that the pressure exerted by the springs 101 is sufficient to strip any work which may be encountered. While in the present embodiment, the stripper and marking plate are the same, any conventional form of stripper plate may be used in a machine which is otherwise designed for marking, this stripper and pressure applying mechanism being of general application, regardless of whether the machine is specifically designed for cutting per se, marking per se, or both. The springs 95 will usually be made so light and few in number as to be inefficient for stripping purposes, thereby avoiding any question of cutting, indenting or otherwise producing undesirable markings. However, it is within the scope of this invention to make these springs of sufficient strength and number to strip in a conventional manner, which stripping may be used in conjunction with the spring means 101.

Inasmuch as the stripping pressures are high, it may be found desirable to utilize lugs 105 on the die holder to assist the usual dovetail on the base of the die unit D in retaining the die unit in position on the carriage or holder 17. In other words, the die may be held at a plurality of points rather than by a central dovetail per se, so that all the strain is not thrown on the dovetail plate at the bottom of the die when the independently mounted stripping pressing means is functioning.

To ensure accurate placement of the work on the plunger, it is contemplated that a convenient form of gage plate, illustration of which will be found in Pat. No. 1,990,593, dated February 12th, 1935, will be positioned on the top of the plunger 16, pins 104 being provided on the plunger to engage and retain such plate. This plate may have suitable abutment gages or other type of gages such that the work can be quickly positioned in accurate alignment with the operating position of the die. Openings may be provided through the plate and the plunger surfaced with brass or other soft metal beneath the plate, to prevent dulling of the cutting dies.

A gaging mask might readily be utilized either in conjunction with or in lieu of such gaging devices. For that matter, a mask or clamp having no gaging function may be provided to cooperate with any desired type of gage for holding the work in its aligned position.

The usual paper backing may be utilized also, to secure satisfactory cutting of the work, and preferably will be fed across the surface of the plunger, beneath the gaging plate, being taken from any convenient source of supply in the machine.

Having thus described the invention, the operation and automatic features thereof will be readily apparent. The normal position of rest, is with the die carriage at the rear of the machine, away from the operator, and the work table or plunger in its lowermost position, the main flywheel pulley of course, continuously rotating. Work may be placed on the plunger, and accurately gaged or aligned with respect to the operating position of the die. Then with a depression of the single treadle connected to the link 58, the machine is caused to operate, the die carriage moves forwardly, trips the plunger control and the plunger rises to strike a hammer-like blow against the die D. While striking the blow, the posts 103 will have raised the plate 99. As it returns to its original position, the plunger trips the die carriage mechanism and the die carriage recedes to the rear of the machine, the plate 99 in the meantime having acted through the pins 96 and stripper S to strip the work. The marking elements will have been inked on the forward stroke by the medium of the inking mechanism 85.

With the arrangement of controls for the die carriage and plunger actuating mechanisms, as described, it is possible to operate the plunger and carriage in synchronized relation, to operate either to the exclusion of the other, or to operate the carriage through a half-stroke, i. e., outwardly to a forward position and stop, or inwardly to a rear position and stop, either alone, or in conjunction with the plunger movement.

It is further evident that the machine is designed for either cutting or marking per se, or in combination.

Important advantages are obtained by the construction wherein it is unnecessary to slide the work support to an inoperative position, for placement of work thereon. With a sliding support, the gage plate mounted on pins 104 would move relative to the backing paper, with a tendency toward displacement of the work, by contact through the openings in the gage plate.

Hence, in machines with slidable work supports, the openings in the gage plate are made as small as possible and beneath them is secured another plate filling all the space possible between the work and the backing paper, as described in Patent No. 1,990,593, to prevent such displacement of the work. The present machine, however, offers no relative movement between the backing paper and the work, after the work is located, and up until the time that the cutting out and marking operation takes place. Therefore, the hole in the gage plate can be made larger, whereupon that portion of the work to be marked will be resting directly on the backing paper and when the marking element contacts the work, the work will be bottomed against the paper and not held away from it by the edges of the opening in the gage plate. This prevents the marking elements from first contacting the work and then moving with the work to bottom it against the paper backing, an operation that might result in a slight shifting of the work, and production of a wide or blurred mark, or a double mark. Further, the thin plate across the bottom of the gage plate can be eliminated. The work can be cut completely around, a feature which is not practical where there is a movement between the work table and the plunger, as the work would go through the opening in the gage plate.

Too much cannot be said about the utility and advantages of the improved stripping mechanism and its operation, as the described arrangement represents a radical departure from mechanisms and stripping operations as have been commonly used heretofore. The time or point during the cycle of operation that the stripping takes place can be regulated, and it is most desirable that the stripping will take place entirely when the work is not pressed against the supporting plate, as would be the case with conventional strippers, wherein springs, rubber or the like exert a strong pressure at all times against the stripping plate. That is to say, in the described arrangement there may be no pressure on the stripping plate at such times as marking and cutting operations are being effected, in which case the springs 95 are deliberately made so small and light as to be inoperative and offer no resistance when there is any pressure directed against the stripping plate from below. This arrangement allows the marking element to perform its functions of marking without indenting the leather, without forcing the ink into the fibers of the leather or even below the normal surface, thereby giving a nice, light, legible mark that is easily removed from the work, where removal of such marks is necessary.

By stripping at a different time or point in the cycle, from that of cutting out, thereby not forcing the marking edge into the material, dangers of cutting the work are avoided.

By marking lightly, but legibly, there is a substantial saving in the amount of ink required.

By the use of this mechanism, certain types of work can be stripped where conventional spring mounted strippers would fail to function properly.

This applies in many instances to rubber strippers. With some characters of work, it has been impossible to strip completely with a conventional stripping mechanism where the pressure mechanism is built within the die, but with this invention, the work can be completely stripped, thus avoiding any necessity of the operator withdrawing by hand the work which might be clinging to the cutting elements of the die.

The present device may be successfully used for impression marking on all thicknesses and characters of work, as the posts which engage the stripper pressure plate can be so adjusted as to permit the proper amount of pressure to be applied, at the proper time and to the depth desired.

Uniform marking of variant thicknesses or characters of material in a uniform manner is attained.

Structurally speaking, it may be noted that many of the advantages inherent in this device are obtained by separating the stripper pressure applying mechanism from the die; that is, the stripper pressure applying mechanism is a unit built into the machine, independent of any particular die, and the point at which the stripping pressure can be applied may be set by adjustment for any particular time during the cycle of operations.

The amount of stripping pressure may be varied by increasing or decreasing the number of springs in the pressure applying mechanism. For a particular stripping pressure mechanism, there is a constant stripping pressure, regardless of the pressure required to strip the work from a given die. This makes it possible to build into one mechanism pressure of a capacity for any die regardless of the stripping pressure required for a particular die.

Many economies in the manufacture of dies may be effected by the arrangement of this invention. Inasmuch as the means for providing all stripping pressure is not required in an individual die, due to the fact that one stripping mechanism in the machine provides the major stripping pressure for any and all dies that are used in connection therewith, the pressure mechanism being built into the machine, the die construction itself can be simplified by the elimination of stripper springs, rubber strippers, reduction in the number of stripper posts and simplification of the parts themselves, etc.

Still another important advantage is found in the fact that by eliminating the stripper pressure means from the individual dies, the individual die construction may be changed and improved over forms which prior practice deemed essential. By simplifying the stripper posts and reducing the number, it is possible to locate these posts at points in the die heretofore thought impossible, due to the small space provided. Marking plates can be made in sections corresponding to work to be cut and marked and may be provided with a top surface, portions of which are higher in some points than in others, thereby accommodating a marking die to laminated work such as appliques, overlays, foxings, saddles, and the like, which in a closed shoe upper, form a surface varying in level. A marking plate, made in sections, will adjust itself readily to care for the varying levels or thicknesses of the work without exerting greater pressure on high points than on low points, or in other words, the marking will be uniform throughout.

Again, an even distribution of pressure regardless of the type of die used, is obtained, and tendency toward rocking or tilting of the stripper plate, thereby avoided. This prevents binding of the plate S, which might happen if the plate tilted, with attendant failure to strip.

The entire construction herein described, regardless of detail and modification, is intended to be "foolproof", as the machine operation is so safe and automatic that a relatively inexperienced operator would have no difficulty in operating the machine in a safe manner.

It will be understood that this description is but illustrative and it is not intended that the invention shall be limited thereby, other than as defined in the appended claims. By way of example, the marking elements might be located elsewhere than on the stripper plate S, or might be omitted; the cutting elements might be relocated, modified or omitted; the clutch 28—30, which is conventional in nature, might be replaced with a roller clutch and suitable adjustments provided in the clutch control unit therefor, and such changes would certainly be within the scope of this invention.

Having thus described our invention, what we claim as new and desire to secure by Letters Patent of the United States, is:—

1. In an ornamenting machine of the class described, a die, stripping means therefor, and means independent of said die for applying stripping pressure to said stripping means.

2. In an ornamenting machine of the class described, a die, stripping means therefor, and means mounted in spaced relation to said die, effective to apply stripping pressure to said stripping means.

3. In an ornamenting machine of the class described, a die, stripping means therefor, means independent of said die for applying stripping pressure to said stripping means, and means to vary the operating relation between said pressure applying means and said stripping means.

4. In an ornamenting machine of the class described, a die, stripping means therefor, means mounted in spaced relation to said die, effective to apply stripping pressure to said stripping means, and means to vary the operating relation between said pressure applying means and said stripping means.

5. In an ornamenting machine of the class described, a die detachably mounted in said machine, stripping means carried by said die, and means independent of said die, mounted in said machine, for applying stripping pressure to said stripping means.

6. In an ornamenting machine of the class described, a die, stripping means therefor, and means separate from said die for actuating said stripping means.

7. In an ornamenting machine of the class described, a die, stripping means therefor, and means separate from said stripping means for actuating the same.

8. In an ornamenting machine of the class described, a die, stripping means therefor, and means separate from said die and said stripping means for actuating the latter.

9. In an ornamenting machine of the class described, a die, stripping means therefor, and means independent of said die and stripping means for applying stripping pressure to the stripping means.

10. In an ornamenting machine of the class described, a die holder in said machine, a die detachably mounted on said holder, stripping means carried by said die, and means mounted in said holder, independently of said die for applying stripping pressure to said stripping means.

11. In an ornamenting machine of the class described, a die holder in said machine, a die detachably mounted on said holder, a stripper plate carried by said die, means mounted in said holder, independently of said die for applying stripping pressure to said stripper, comprising a plate mounted in said holder for movement toward and from said stripper, pressure applying means in said holder cooperative with said plate, and means interposed between said pressure plate and said stripper plate effective to transmit pressures from the pressure applying means to said stripper.

12. In an ornamenting machine of the class described, a die holder in said machine, a die detachably mounted on said holder, a stripper plate carried by said die, means mounted in said holder, independently of said die for applying stripping pressure to said stripper, comprising a plate mounted in said holder for movement toward and from said stripper, pressure applying means in said holder cooperative with said plate, and means interposed between said pressure plate and said stripper plate effective to transmit pressure from the pressure applying means to said stripper, said last means comprising studs on said stripper and studs on said pressure plate in substantial alignment with the stripper studs and engageable therewith.

13. In an ornamenting machine of the class described, a movable work supporting plunger, an ornamenting die, a stripper carried by said die, means independent of said die for applying stripping pressure to said stripper, and means carried by said plunger for restraining said pressure applying means during an ornamenting operation by the die.

14. In an ornamenting machine of the class described, a movable work supporting plunger, a die carriage movable in said machine, an ornamenting die detachably mounted on said carriage, a stripper carried by said die, means independent of said die for applying stripping pressure to said stripper, and means carried by said plunger for restraining said pressure applying means during an ornamenting operation by the die.

15. In an ornamenting machine of the class described, a movable work supporting plunger, an ornamenting die, stripping means for said die, means independent of said die for applying stripping pressure to said stripper, and means carried by said plunger for moving said pressure applying means from an operative position to an inoperative position, during the normal cycle of the machine.

16. In an ornamenting machine of the class described, a movable work support, a die carriage movable relative to said plunger, an ornamenting die secured to said carriage, a stripper carried by said die, means independent of said die for actuating said stripper, and means carried by said plunger for moving said stripper actuating means from an operative position to an inoperative position, during the normal cycle of the machine.

17. A stripping mechanism for dies, comprising a stripper plate associated with the die, a pressure applying means independent of the die and stripper plate for actuating said plate, and means for controlling operation of said pressure applying means.

18. A stripping mechanism for dies, comprising a die, a support therefor, a stripper plate associated with said die, a pressure applying means independent of said die and stripper plate for actuating said plate, including a member mounted in said support for engagement with said stripper plate and for movement therewith, spring means for actuating said member, and means for moving said member against said spring means thereby to compress same, whereby said spring means subsequently urge said member against said stripper plate to actuate same through a stripping operation.

19. A stripping mechanism for ornamenting dies comprising a die support, a die carried thereby, a stripper associated with the cutting elements of said die, said die support comprising a hollow carriage, having a perforated surface adjacent the die, a plate slidable in said support, a series of studs carried by said plate and projecting into the perforations of said surface, spring means carried within said support between the upper wall thereof and said plate, said stripper having a series of studs disposed in substantial alignment with said perforations and of a length sufficient to periodically engage the studs on the plate, and means to actuate said plate in a direction away from the stripper and against the spring means thereby to compress the latter, whereby said spring means will urge said plate toward the stripper when said plate actuating means is removed.

20. A stripping mechanism for ornamenting dies comprising a die support, a die carried thereby, a stripper associated with the cutting elements of said die, said die support comprising a hollow carriage, having a perforated surface adjacent the die, a plate slidable in said support, a series of studs carried by said plate and projecting into the perforations of said surface, spring means carried within said support between the upper wall thereof and said plate, said stripper having a series of studs disposed in substantial alignment with said perforations and of a length sufficient to periodically engage the studs on the plate, means to actuate said plate in a direction away from the stripper and against the spring means, thereby to compress the latter, whereby said spring means will urge said plate toward the stripper when said plate actuating means is removed, and struts within said support effective to support the upper and lower walls thereof against pressures applied thereto.

21. In an ornamenting machine of the class described, a movable work support, an ornamenting die mounted for movement into and out of an aligned operating position relative to said work support, means associated with said die for stripping work therefrom, means mounted in said machine independently of said die for actuating said stripping means, and means to actuate said support, die and stripping means in synchronized relation.

22. In an ornamenting machine of the class described, a movable work support, an ornamenting die mounted for movement into and out of an aligned operating position relative to said work support, means associated with said die for stripping work therefrom, means mounted in said machine independently of said die for actuating said stripping means, means carried by said support for actuating said stripper actuating means, and means to actuate said support, die, stripping means and stripper actuating means in synchronized relation.

23. In a stripper for shoe ornamenting machines having a die, stripping means associated with the die, stripper actuating means associated with the machine, and means to coordinate the stripping means and the stripper actuating means whereby to actuate said stripping means at a predetermined point in the cycle of operations of the machine.

24. In a stripper for shoe ornamenting machines having a die unit, stripping means associated with the die, stripper actuating means built into the machine, and means to bring said stripper actuating means and said stripping means into operative relationship whereby to strip the work from the die.

25. An ornamenting machine of the class described, comprising a movable work support, an ornamenting die mounted for movement into and out of an aligned operating position relative to said work support, means to actuate said die, means to actuate said support through an operating stroke, and means controlled by said die for initiating operation of said support actuating means, whereby said support will effect an ornamentation of a work piece positioned thereon when the die is in its aligned operating position.

26. An ornamenting machine of the class described, comprising a movable work support, an ornamenting die mounted for movement into and out of an aligned operating position relative to said work support, means to actuate said die to its aligned position, means to actuate said support through an operating stroke, means controlled by said die for initiating operation of said support actuating means when the die reaches its aligned position whereby said support will effect an ornamentation of a work piece positioned thereon when the die is in its aligned operating position, and means controlled by said support for initiating operation of said die actuating means to return the die to its original position after ornamentation of the work.

27. In an ornamenting machine of the class described, a cutting die, a stripper plate carried thereby, work marking elements mounted on said stripper plate, means to apply a marking medium to said marking elements, and means independent of the die for applying stripping pressure to said stripper plate.

28. In an ornamenting machine of the class described, a cutting die, a stripper plate resiliently mounted thereon, work marking elements mounted on said stripper plate, means to apply a marking medium to said marking elements, and means mounted in spaced relation to said die effective to apply stripping pressure to said stripper plate.

29. In an ornamenting machine of the class described, a work support, a cutting die, a stripper plate carried thereby, work marking elements mounted on said stripper plate, means to apply a marking medium to said marking elements, driving means to produce a relative movement between said work support, and said die and marking elements, means independent of said die and marking elements for applying stripping pressure to said stripper plate, and means to actuate said medium applying means from said driving means.

30. In an ornamenting machine of the class described, a work support, a cutting die, a stripper plate carried thereby, work marking elements mounted on said stripper plate, means to apply a marking medium to said marking elements, said applying means being normally positioned in an inoperative relation to said marking elements, driving means to produce a relative movement between said work support, and said die and marking elements, means independent of said die and marking elements for applying stripping pressure to said stripper plate, and means to move said medium applying means into operative relation to said marking elements and to actuate the same from said driving means.

31. In an ornamenting machine of the class described, a cutting die, a stripper plate carried thereby, work marking elements mounted on said stripper plate, and means independent of said die to apply pressure to said stripper plate at one point in the cycle of operations, whereby said marking elements will place an impression marking upon the work, and thereafter to apply pressure to said plate whereby to strip the work from the die.

32. In an ornamenting machine of the class described, a cutting die, a stripper plate carried thereby, work marking elements mounted on said stripper plate, means independent of said die to apply pressure to said stripper plate at one point in the cycle of operations, whereby said marking elements will place an impression marking upon the work, and thereafter to apply pressure to said plate whereby to strip the work from the die, and means to vary the pressures so applied.

33. In an ornamenting machine of the class described, a work support, an ornamenting die, stripping means for said die, means independent of said die for applying stripping pressure to said stripper, and means for restraining said pressure applying means during an ornamenting operation by the die.

34. In ornamenting machines of the class described, a die, stripping means therefor, means for applying stripping pressure to said stripping means, and additional means independent of said die for applying additional stripping pressure thereto.

35. In an ornamenting machine of the class described, a die, stripping means therefor, means constantly applying stripping pressure thereto, and means intermittently to apply stripping pressure thereto.

36. In an ornamenting machine of the class described, a die, stripping means therefor, means carried by said die for constantly applying stripping pressure thereto, and means independent of said die intermittently to apply stripping pressure thereto.

37. In ornamenting machines of the class described, a die, stripping means therefor, and divided means for applying stripping pressure to said stripping means.

38. In ornamenting machines of the class described, a die, stripping means therefor, and divided means for applying stripping pressure to said stripping means, one portion of said divided means being located in spaced relation to said die.

39. In ornamenting machines of the class described, a die, a stripping plate therefor, spring means supporting said stripping plate in operable relation to said die, and means independent of said die for applying stripping pressure to said stripping plate.

BENJAMIN W. FREEMAN.
JOHN SCHNEIDER.